US012740915B1

(12) United States Patent
Banyash

(10) Patent No.: US 12,740,915 B1
(45) Date of Patent: Sep. 22, 2026

(54) BREAST MASSAGE DEVICE

(71) Applicant: THERATAS, LLC, Apex, NC (US)

(72) Inventor: Kelsey Banyash, Apex, NC (US)

(73) Assignee: THERATAS, LLC, Apex, NC (US)

( * ) Notice: Subject to any disclaimer, the term of this patent is extended or adjusted under 35 U.S.C. 154(b) by 677 days.

(21) Appl. No.: 18/201,609

(22) Filed: May 24, 2023

Related U.S. Application Data

(60) Provisional application No. 63/345,376, filed on May 24, 2022.

(51) Int. Cl.
*A61H 7/00* (2006.01)

(52) U.S. Cl.
CPC ..... *A61H 7/007* (2013.01); *A61H 2201/0107* (2013.01); *A61H 2201/013* (2013.01); *A61H 2201/1207* (2013.01); *A61H 2205/082* (2013.01)

(58) Field of Classification Search
CPC ........ A61H 7/00; A61H 7/008; A61H 9/0057; A61H 19/32; A61H 2015/0064; A61M 1/0697
See application file for complete search history.

(56) References Cited

U.S. PATENT DOCUMENTS 915,251 A 3/1909 Vanderslice
1,651,585 A * 12/1927 Clair ...................... A61H 7/005 15/364
2,258,931 A 10/1941 Heer et al.
3,081,768 A 3/1963 Rosenberg
RE30,500 E 2/1981 Springer et al.
4,326,509 A 4/1982 Stauffer
5,336,158 A * 8/1994 Huggins ................ A61H 9/005 601/14
(Continued)

FOREIGN PATENT DOCUMENTS

CN 203329011 U * 12/2013
CN 203885817 U 10/2014
(Continued)

OTHER PUBLICATIONS

Machine translation of CN-203329011-U. Accessed from PE2E on Feb. 2026. (Year: 2013).*
(Continued)

*Primary Examiner* — Joseph D. Boecker
*Assistant Examiner* — Jaeick Jang
(74) *Attorney, Agent, or Firm* — Malloy & Malloy, P.L.; Rafay Asrar

(57) ABSTRACT

A breast massage device for use on a person's breast, for example, a breast of a person who has undergone breast surgery. The breast massage device includes a massage head assembly having a massage head. A massage member assembly is interconnected to the massage head assembly and includes one or more massage members moveably mounted in the massage head assembly. A massage member drive assembly operatively engages each of the massage members to cause movement of each, such as a rotational movement. A suction assembly includes a suction fan and is dimensioned and configured to create a suction force proximate the massage head of the massage head assembly to facilitate maintaining the massage head in an operative position on the person's breast while the breast massage device is in use in a massaging orientation on a person's breast.

17 Claims, 9 Drawing Sheets

(56) References Cited

U.S. PATENT DOCUMENTS

| | | | |
|---|---|---|---|
| 5,447,491 | A | 9/1995 | Bellandi |
| 2016/0058645 | A1 | 3/2016 | Tsai |
| 2016/0331627 | A1 | 11/2016 | Kooijker et al. |

FOREIGN PATENT DOCUMENTS

| | | | | | |
|---|---|---|---|---|---|
| CN | 205598180 | U | | 10/2014 | |
| CN | 106214441 | A | | 12/2016 | |
| CN | 109044758 | A | | 12/2018 | |
| FR | 2692780 | A1 | * | 12/1993 | ............. A61H 9/005 |
| WO | WO-2006038277 | A1 | * | 4/2006 | ............. A61H 9/005 |

OTHER PUBLICATIONS

Machine translation of WO-2006038277-A1. Accessed from PE2E Search on Feb. 2026. (Year: 2006).*

Machine translation of FR-2692780-A1. Accessed from PE2E Search on Feb. 2026. (Year: 1993).*

* cited by examiner

BREAST MASSAGE DEVICE

CROSS-REFERENCE TO RELATED APPLICATIONS

This application claims the benefit of U.S. Provisional Patent Application No. 63/345,376, filed on May 24, 2022, which is incorporated by reference herein in its entirety.

FIELD OF THE INVENTION

The present invention relates generally to a breast massage device, and more in particular, a breast massage device for use by persons recovering from breast surgery.

BACKGROUND OF THE INVENTION

It has been recently reported that about 1 in 8 women in the United States will develop invasive breast cancer over the course of their lifetime. This number is significantly lower for men, with only about 1 in 800 men at risk from breast cancer. In addition, next to lung cancer, breast cancer is the leading cause of death in women from cancer.

In many cases, breast cancer presents in the form of a lump or mass in a portion of the breast, and treatment options often include removal of the lump or mass. The primary procedures used to remove a cancerous lump of mass from the breast are a mastectomy, in which the entire affected breast is removed, or a lumpectomy, in which the healthy breast tissue is conserved, i.e., it is not removed during the procedure. Radiation treatment, chemotherapy and/or hormonal therapy may proceed or follow either of these surgical procedures, once again, a mastectomy or a lumpectomy, depending on the type of cancer, a patient's age and overall health, among many other factors, which a treating physician will recommend on a case by case basis. In some cases, reconstructive surgery will follow successful breast cancer treatment in order to return the affected breast or breasts to a pre-surgery state to the extent possible.

Following any surgery, hardened scar tissue will from at the site of the incision or incisions into the patient's tissue. Surgery for breast cancer patients is no different, and as should be appreciated, hardened scar tissue in soft breast tissue is undesirable and often painful. Following breast cancer surgery, a tissue expander may be placed proximate the breasts to gradually stretch the tissue and skin for purposes of accommodating a future breast implant. These tissue expanders are known to cause additional discomfort to the patient which must be endured by the patient for extended periods of time, typically months.

Regardless of whether a breast tissue expander is in place or not, it is understood that massaging the areas around the scar tissue formed after breast surgery can keep the scar supple and flexible. It helps to keep the scar tissue remain moist, which aids the overall healing process.

However, massaging a breast after breast surgery should be performed by a highly skilled massage therapist, however, it is believed that following surgery, many women are unable to receive such massage therapy due to the costs involved, or are simply unwilling to undergo further treatment which may be perceived as invasive. As such, it would be beneficial to provide a device which would permit a patient to obtain an effective breast massage following breast surgery in a less intrusive manner.

Accordingly, there is an established need for a solution to one or more of the aforementioned shortcomings in the current state of the art.

SUMMARY OF THE INVENTION

The present invention is directed generally to a breast massage device.

In one implementation of the invention, a breast massage device comprises: a massage head assembly comprising a massage head; a massage member assembly including at least one massage member disposed in a moveable engagement therewith, the massage member assembly interconnected to the massage head assembly; a massage member drive assembly disposed in an operative engagement with the at least one massage member to cause movement thereof, and, a suction assembly dimensioned and configured to create a suction force proximate the massage head to facilitate maintaining the massage head in an operative position on the person's breast.

In a second aspect, the breast massage device can include a massage head having a cover and an end cap affixed thereto.

In another aspect, the breast massage device may have an end cap including a concave configuration to facilitate engagement of the massage head with the person's breast.

In a further aspect, the breast massage device can include a massage member assembly having a plurality of massage members each disposed in a moveable engagement therewith.

In one other aspect, the breast massage device may have a plurality of massage members arranged in the massage member assembly in a massage member array.

In yet another aspect, the breast massage device can include a massage member drive assembly disposed in an operative engagement with each of the plurality of massage members to cause movement of each.

In still one further aspect, the breast massage device may have a massage member assembly including at least one massage member socket dimensioned and configured to receive the at least one massage member therein, the at least one massage member moveably retained in the at least one massage member socket.

In yet one other aspect, the breast massage device can include a massage member assembly having a plurality of massage member sockets each dimensioned and configured to receive a different one of the plurality of massage members therein, each of the plurality of massage members moveably retained in a corresponding one of the plurality of massage member sockets.

In still another aspect, the breast massage device may have a massage member assembly including at least one enlarged massage member having a volume which is greater than the at least one massage member.

In yet one further aspect, the breast massage device can include a massage member drive assembly having a motor interconnected to a drive member, the drive member operatively engages the at least one massage member to cause movement thereof while the motor is actuated.

In still one other aspect, the breast massage device may have a drive member which is a wheel.

In yet another aspect, the breast massage device can include a massage member drive assembly having a pressure regulating member disposed in an operative communication with the drive member, the pressure regulating member operable to selectively adjust an amount of pressure applied to the at least one massage member by the drive member, which also adjusts an amount of pressure applied to at least a portion of the person's breast by the at least one drive member.

In still one further aspect, the breast massage device may have a suction assembly including an intake channel and a discharge channel disposed in fluid communication with the massage head.

In yet one other aspect, the breast massage device can include a suction assembly having a suction fan disposed in fluid communication with the discharge channel and operative to cause an airflow into and through the intake channel and out through the discharge channel, the airflow creating the suction force proximate the massage head.

In still another aspect, the breast massage device may have a suction fan wherein a speed of the suction fan is adjustable to increase or decrease the suction force proximate the massage head to facilitate maintaining the massage head in an operative position on the person's breast.

In one other implementation of the invention, a breast massage device comprises: a massage head assembly comprising a massage head; a massage member assembly including a plurality of massage members each disposed in a moveable engagement therewith, the massage member assembly interconnected to the massage head assembly; a massage member drive assembly disposed in an operative engagement with each of the plurality of massage members to cause movement thereof; the massage member drive assembly comprising a plurality of motors each interconnected to a corresponding one of a plurality of drive members, each of the plurality of drive members operatively engages a corresponding one of a plurality of massage members to cause movement thereof while a corresponding one of the plurality of motors is actuated; and, a suction assembly dimensioned and configured to create a suction force proximate the massage head to facilitate maintaining the massage head in an operative position on the person's breast.

In one further implementation of the invention, a breast massage device comprises: a massage head assembly comprising a massage head; the massage head having a cover and an end cap affixed thereto, wherein the end cap comprises a concave configuration to facilitate engagement of the massage head with the person's breast, a massage member assembly including a plurality of massage members each disposed in a moveable engagement therewith, the massage member assembly interconnected to the massage head assembly; the massage member assembly further comprising a plurality of massage member sockets each dimensioned and configured to receive a different one of the plurality of massage members therein, each of the plurality of massage members moveably retained in a corresponding one of the plurality of massage member sockets; a massage member drive assembly disposed in an operative engagement with each of the plurality of massage members, wherein the massage member drive assembly comprises a plurality of motors each interconnected to a corresponding one of a plurality of drive members, each of the plurality of drive members operatively engages a corresponding one of a plurality of massage members to cause movement thereof while a corresponding one of the plurality of motors is actuated; a suction assembly dimensioned and configured to create a suction force proximate the massage head to facilitate maintaining the massage head in an operative position on the person's breast, and, the suction assembly comprises a suction fan disposed in fluid communication with a discharge channel and operative to cause an airflow into and through an intake channel and out through the discharge channel, the airflow creating the suction force proximate the massage head, and wherein a speed of the suction fan is adjustable to increase or decrease the suction force proximate the massage head as needed to facilitate maintaining the massage head in an operative position on the person's breast.

These and other objects, features, and advantages of the present invention will become more readily apparent from the attached drawings and the detailed description of the embodiments, which follow.

BRIEF DESCRIPTION OF THE DRAWINGS

The embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a breast massage device, generally as shown as at 100 throughout the figures. More in particular, in at least one embodiment, the present invention is directed to a breast massage device 100 for use by persons recovering from breast surgery.

Figure 1:
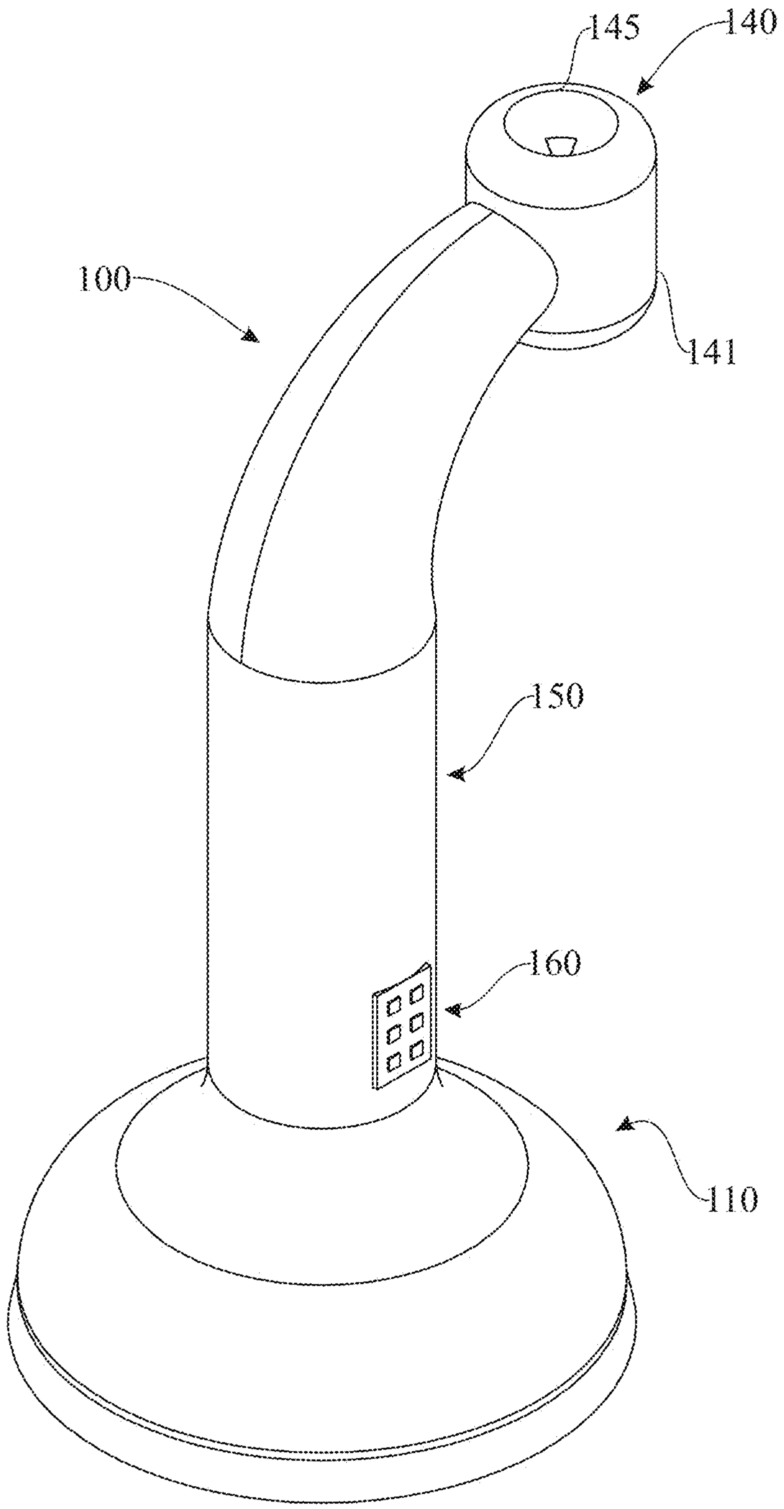
FIG. 1 presents a top perspective view of one illustrative embodiment of a breast massage device, in accordance with the present invention.
Figure 2:
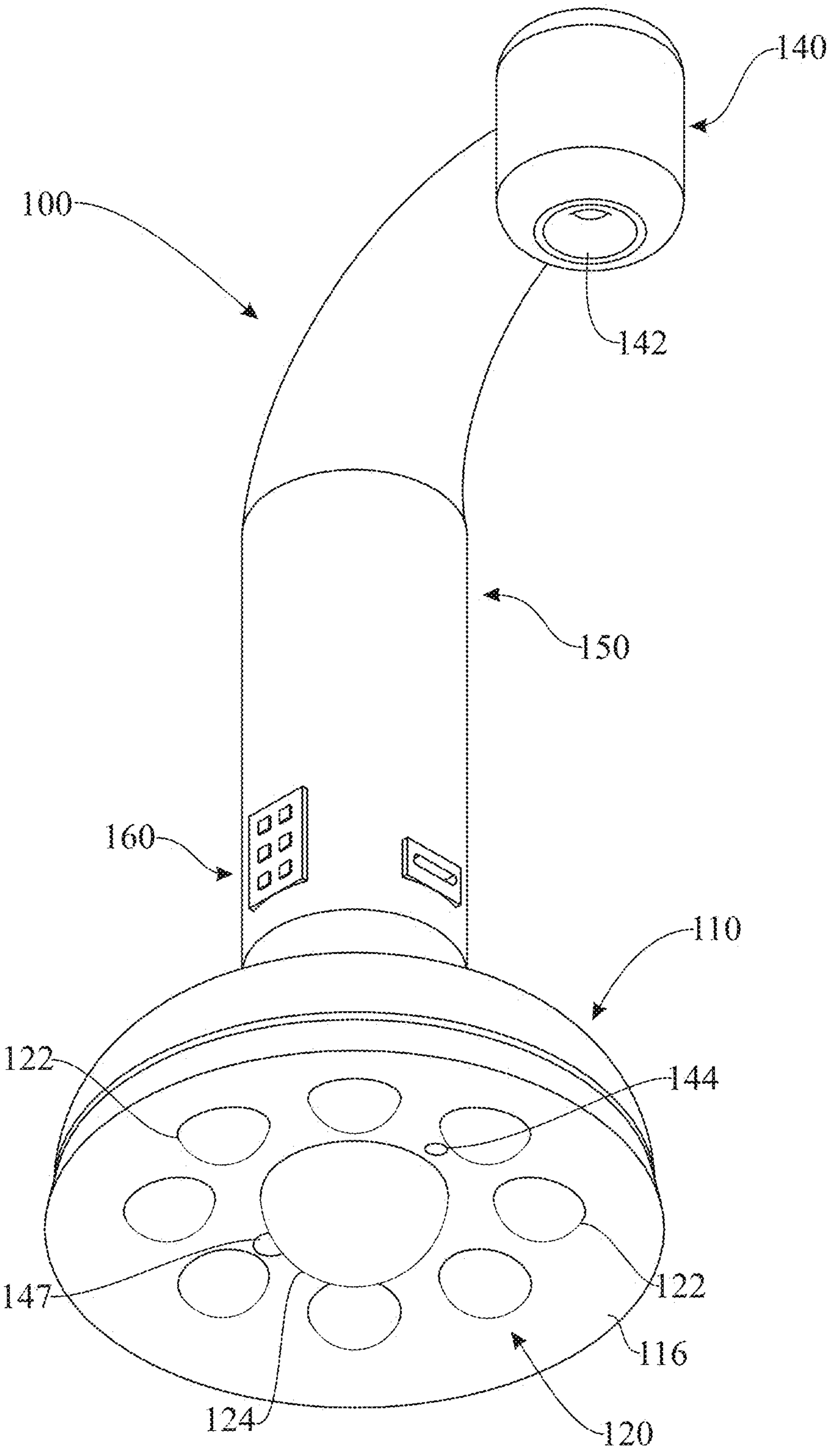
FIG. 2 presents a bottom perspective view of the breast massage device of FIG. 1, in accordance with the present invention.

Referring initially to FIGS. 1 and 2, presented therein are top and bottom perspective views, respectively, of one illustrative embodiment of a breast massage device 100, in accordance with the present invention.

Figure 3:
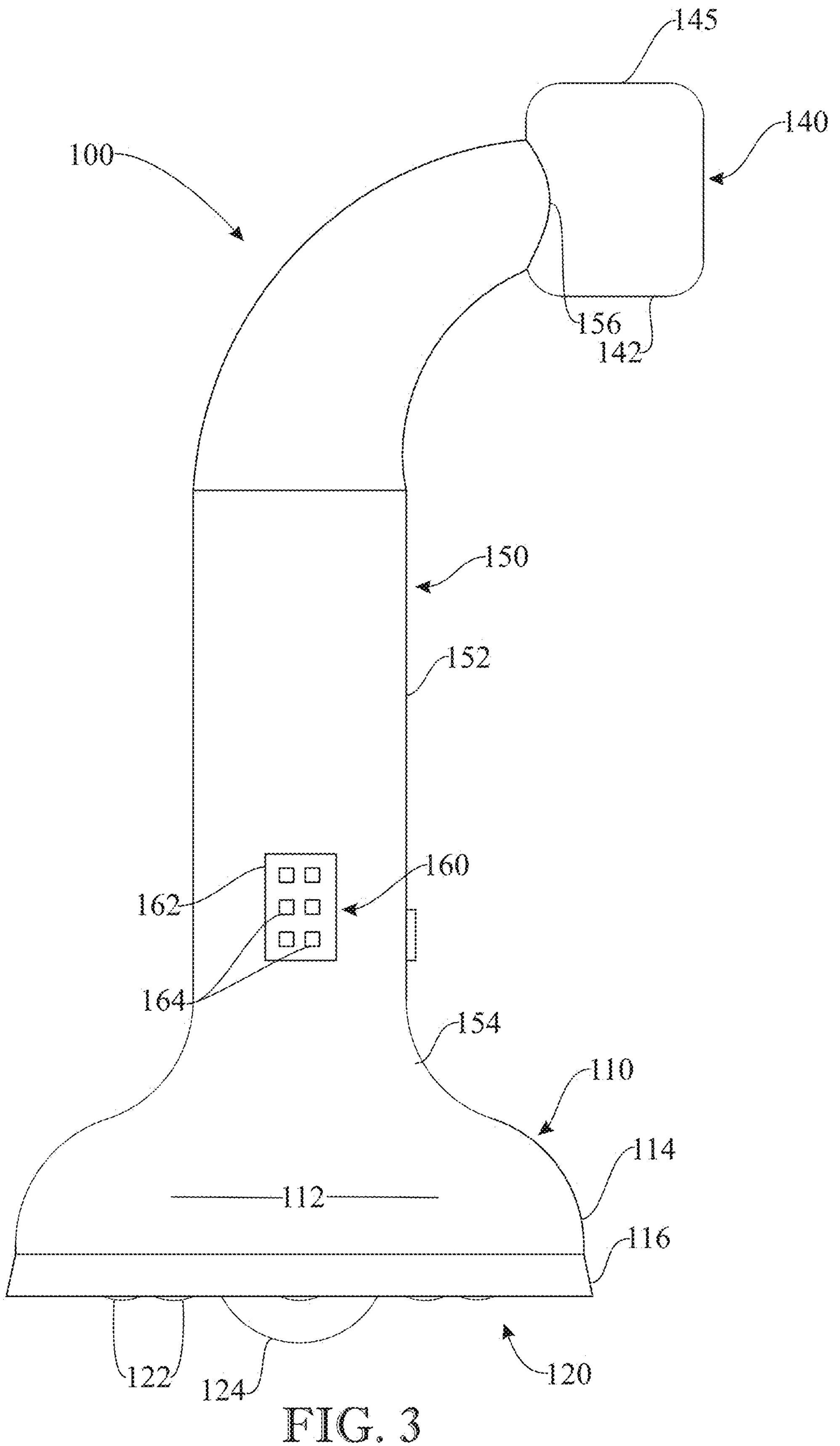
FIG. 3 presents a side elevation of the breast massage device of FIG. 1, in accordance with the present invention.
Figure 8:
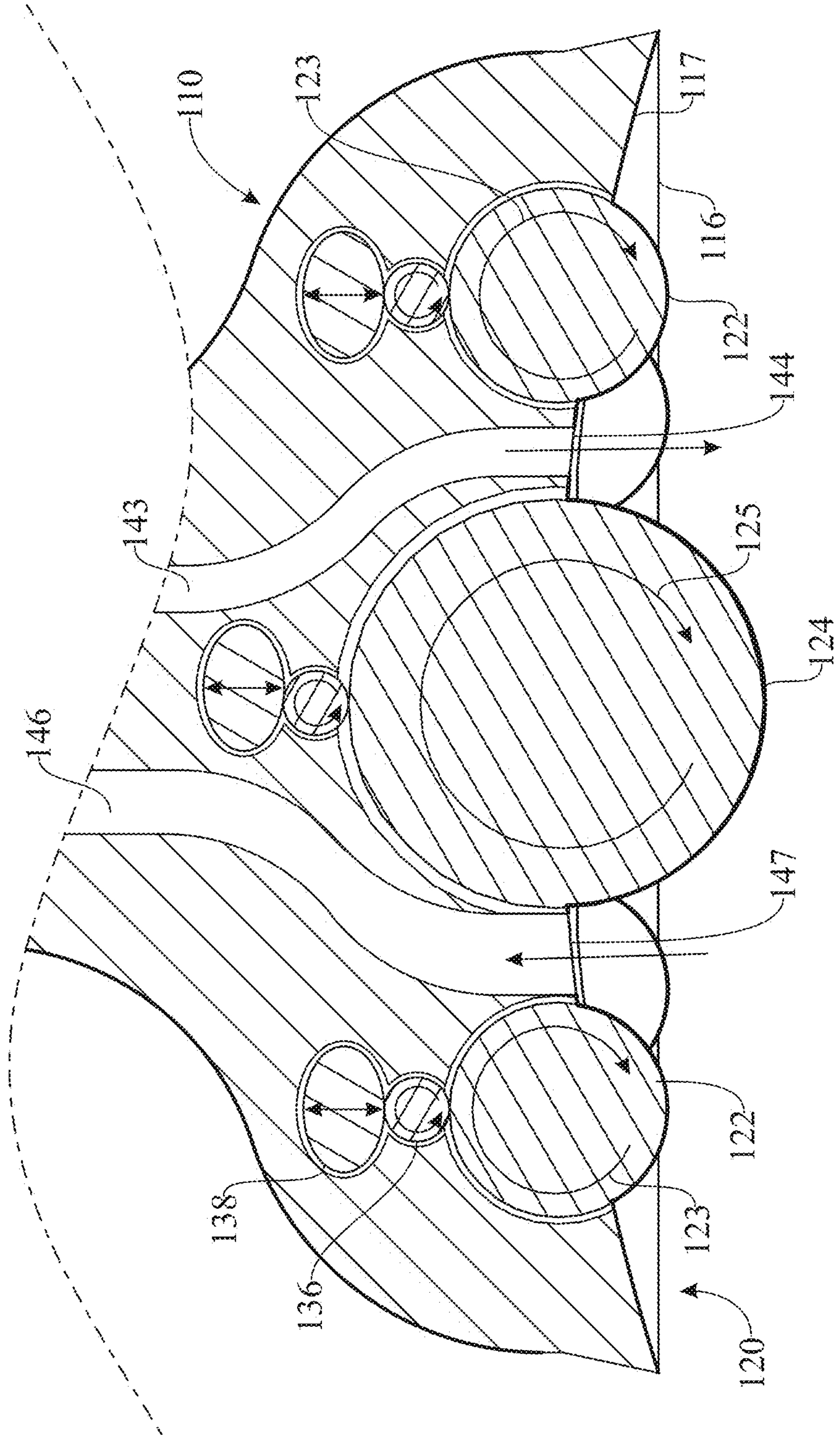
FIG. 8 presents an enlarged view of a portion of the cross section of the breast massage device of FIG. 7, in accordance with the present invention.

A breast massage device 100 in accordance with the present invention includes a massage head assembly 110, as shown in FIGS. 1 and 2. A massage head assembly 110 includes a massage head 112. A massage head 112 includes a cover 114 and an end cap 116, such as is shown best in the illustrative embodiment of FIG. 3. In at least one embodiment, an end cap 116 of a massage head 112 comprises a concave configuration 117, such as is shown in FIG. 8, to facilitate engagement of the massage head 112 with at least a portion of a user's breast.

A breast massage device 100 in accordance with the present invention also includes massage member assembly 120. With reference again to FIG. 2, in at least one embodiment, a massage member assembly 120 is interconnected to the massage head assembly 110. A massage member assembly 120 includes at least one massage member 122, wherein the at least one massage member 122 is disposed in a movable engagement with the massage member assembly 120. In one embodiment, at least one massage member 122 is disposed in a rotational engagement with a massage member assembly 120. In at least one further embodiment, a massage member assembly 120 comprises a plurality of massage members 122, as shown in FIG. 2, wherein each of the plurality of massage members 122 is disposed in movable engagement with the massage member assembly 120. As further shown in FIG. 2, a massage member assembly 120 in at least one embodiment includes at least one enlarged massage member 124, wherein an enlarged massage member 124 is at least partially defined by having a volume that is greater than the volume of individual ones of the plurality of massage members 122. The massage members 122, 124 in at least one embodiment comprise a rigid material of construction such as metal, metal alloys, rigid plastics, glass, etc., wherein "rigid" is at least partially defined as a material that will not deform when placed into contact with a person's breast under operating pressures of the present breast massage device. In at least one further embodiment, the massage members 122, 124 are constructed of a material which may be heated so as to impart an amount of heat to the portion of the person's breast on which the massage member assembly 120 is positioned during use. As one example, an infrared heating element may be incorporated into the present breast massage device 100 in proximity to one or more of massage members 122, 124 to transfer heat energy to the one or more of massage members 122, 124 during use.

Figure 4:
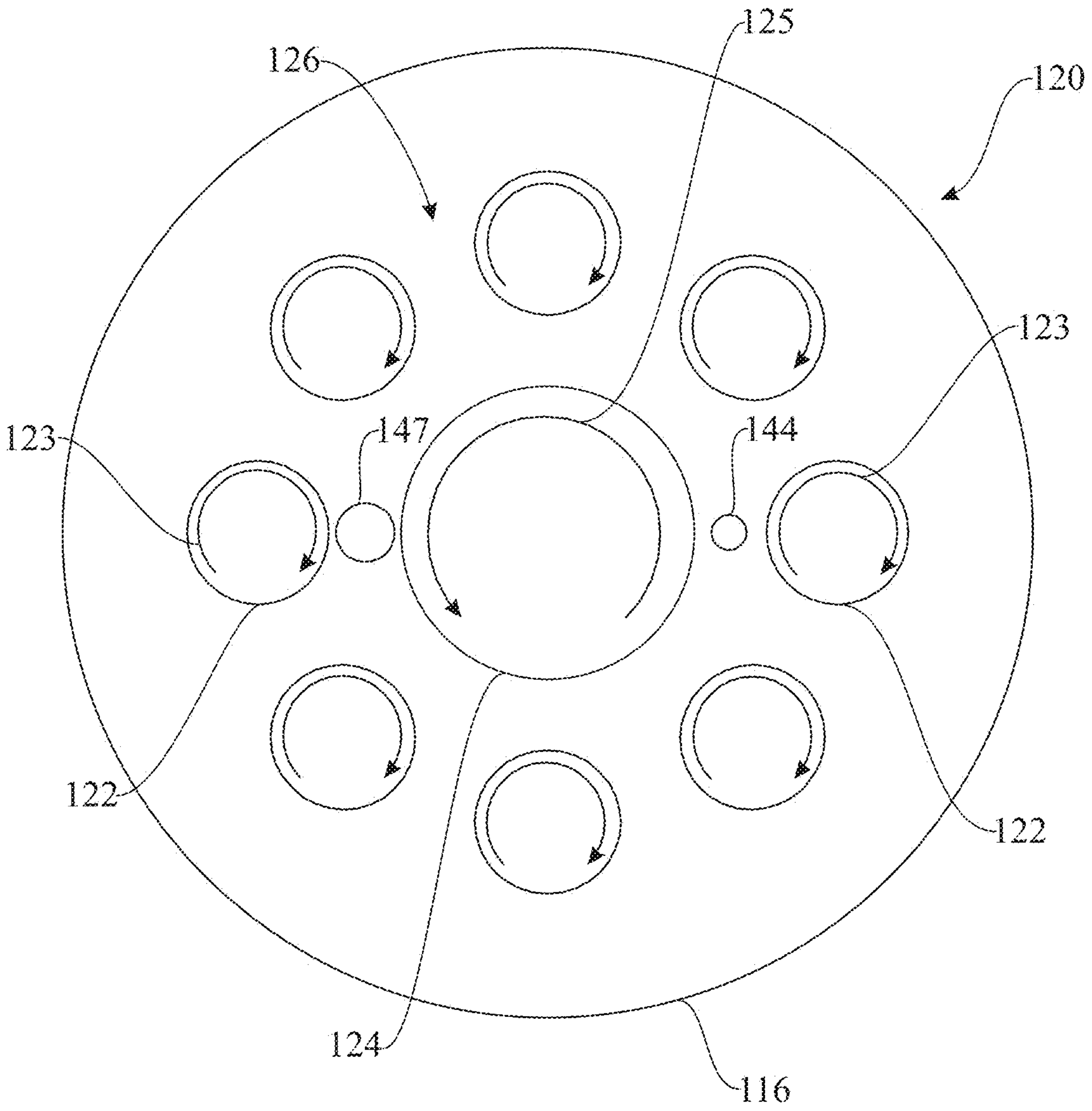
FIG. 4 presents a bottom plan view of one illustrative embodiment of a massage member assembly of a breast massage device, in accordance with the present invention.

With reference to FIG. 4, in at least one embodiment a plurality of massage members 122 and at least one enlarged massage member 124 are disposed in massage member assembly 120 in a massage member array 126. As shown in FIG. 4, a massage member array 126 includes an enlarged massage member 124 positioned in the center equidistant from each of the plurality of massage members 122 which are disposed in a circular arrangement surrounding the enlarged massage member 124. It is to be appreciated that a massage member array 126 in accordance with the present invention may include any of a plurality of other geometric arrangements of one or more massage member 122 and/or one or more enlarged massage member 124.

Figure 5:
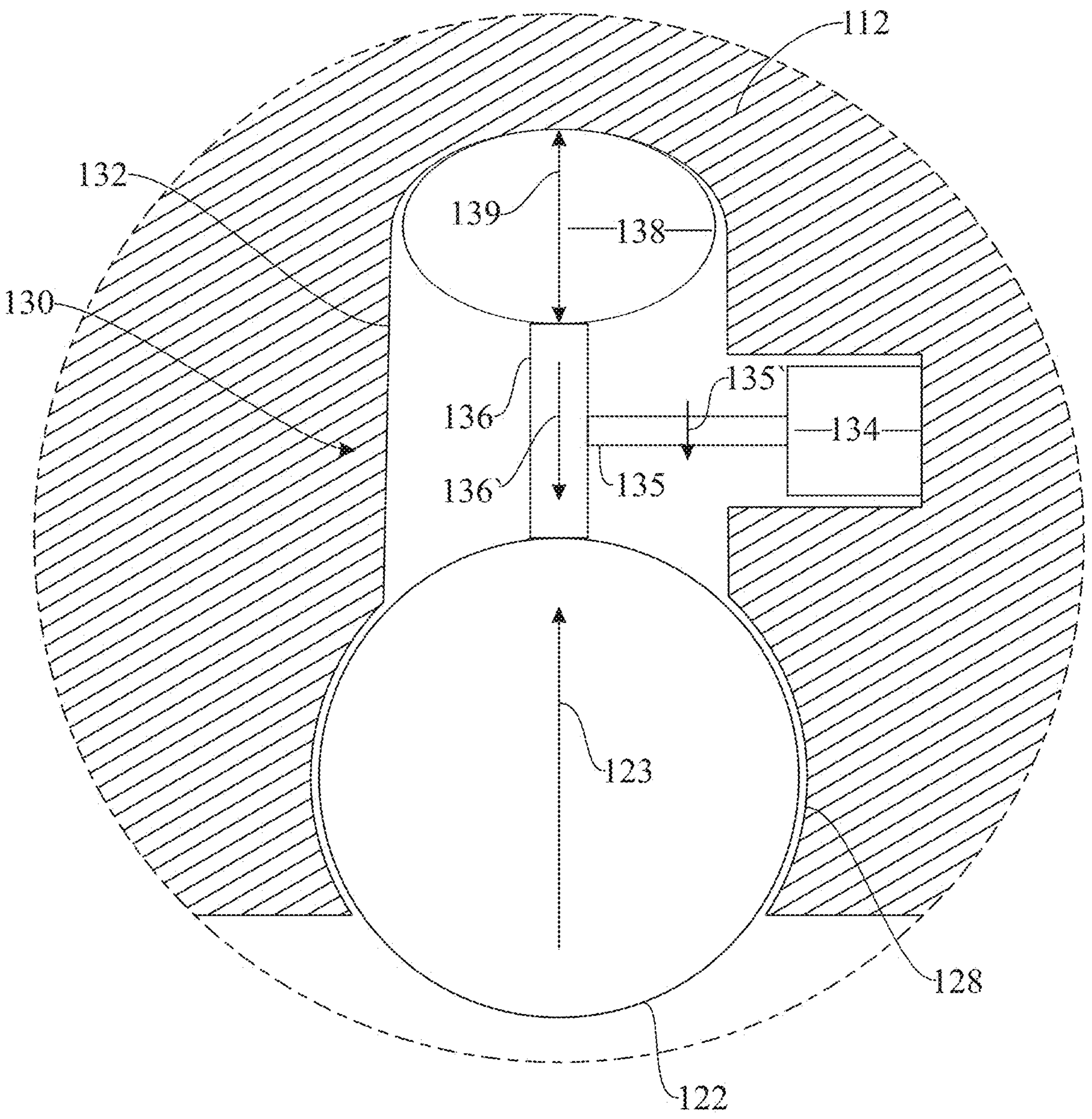
FIG. 5 presents a partial cross-sectional view of one illustrative embodiment of a massage member drive assembly of a breast massage device, in accordance with the present invention.
Figure 6:
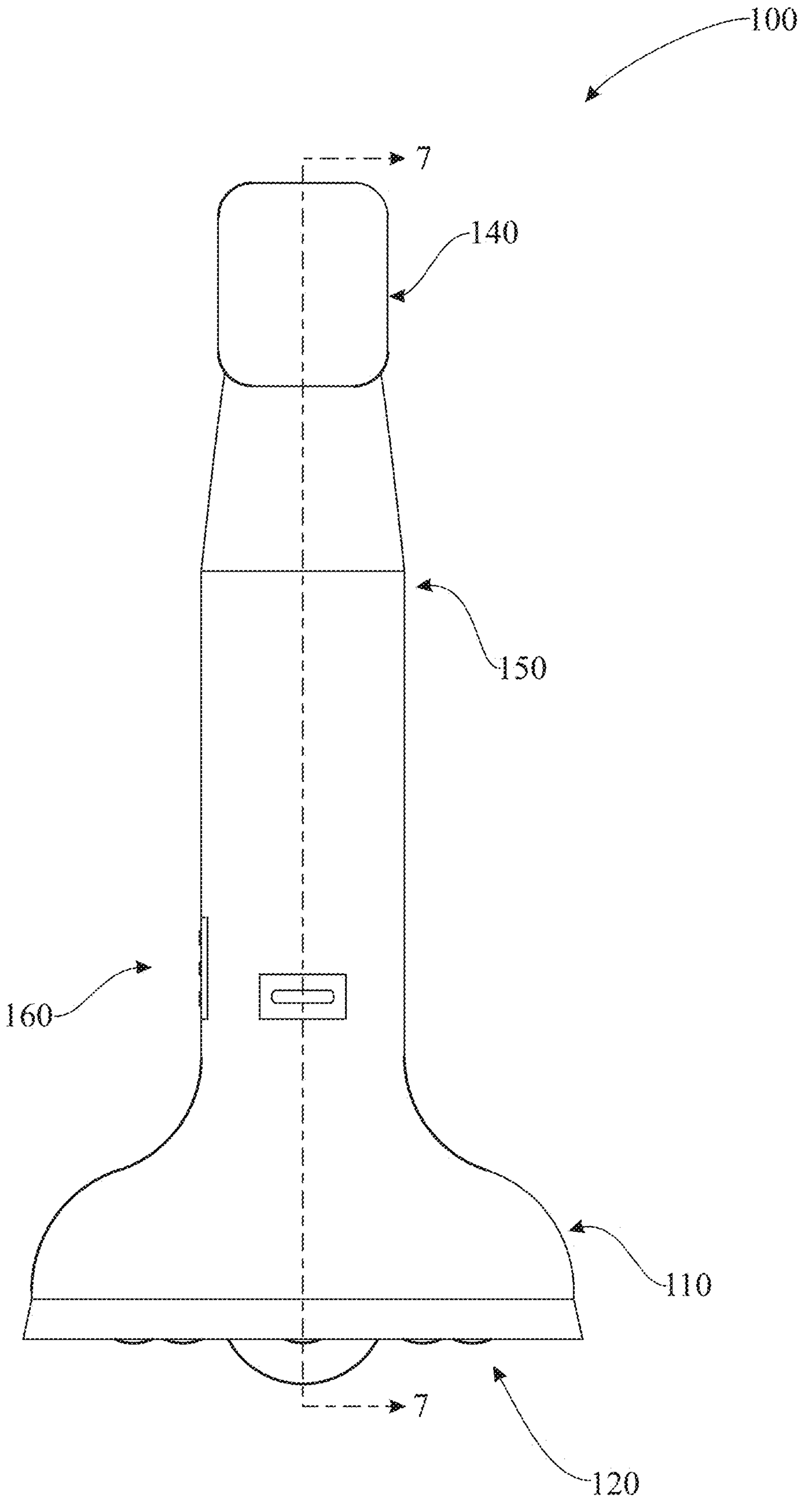
FIG. 6 presents a front elevation of the breast massage device of FIG. 1, in accordance with the present invention.
Figure 7:
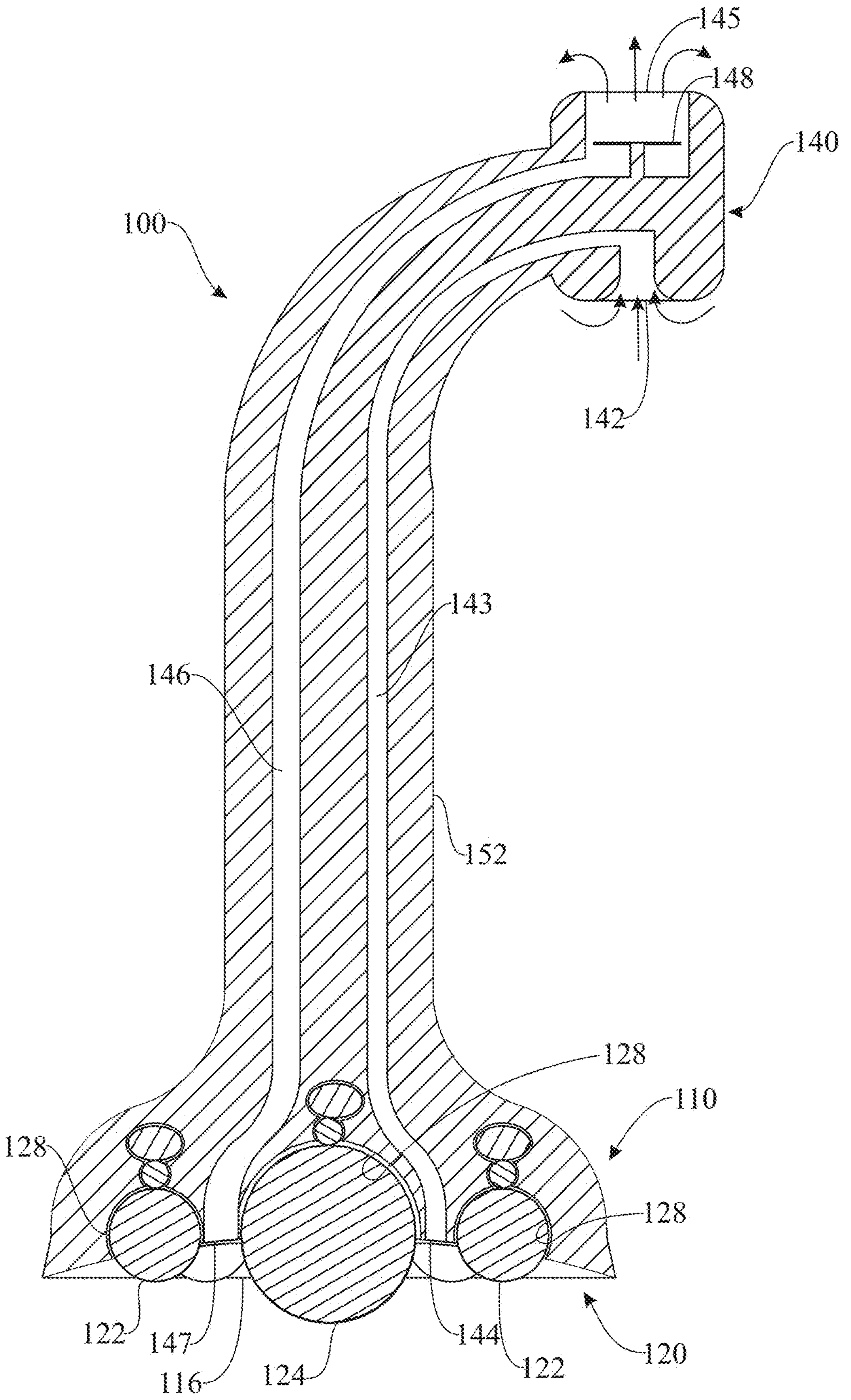
FIG. 7 presents a cross section of the breast massage device of FIG. 6 along lines 7-7 thereof, in accordance with the present invention.

A massage member assembly 120 in accordance with at least one embodiment of the present invention includes a massage member socket 128 which is dimensioned and configured to receive at least one massage member 122 therein, such as is shown in FIG. 5. In one further embodiment, a massage member assembly 120 in accordance with the present invention includes a plurality of massage member sockets 128, wherein each of the plurality of massage member sockets is dimensioned and configured to receive a different one of a plurality of massage members 122, 124 therein, such as is shown best in FIG. 7.

As before, each massage member 122 is disposed in a movable engagement with the massage member assembly 120. With reference to FIG. 4, in at least one embodiment each of a plurality of massage members 123 and an enlarged massage member 124 are disposed in a rotational engagement with massage member assembly 120, such as is illustrated by way of rotational arrows 123, 125, respectively. Stated otherwise, in at least one embodiment, each of a plurality of massage members 122 and/or enlarged massage member(s) 124 are received in a corresponding one of a plurality of massage member sockets 128 such that each massage member 122, 124 is disposed in a rotational engagement with massage member assembly 120. In at least one embodiment, the plurality of massage members 122 may rotate in one direction, while the enlarged massage member 124 rotates in an opposite direction.

A breast massage device 100 in accordance with the present invention further comprises a massage member drive assembly 130. A massage member drive assembly 130 in one embodiment is disposed in an operative engagement with at least one massage member 122, wherein the operative engagement is at least partially defined by the massage member drive assembly 130 causing movement of the at least one massage member 122. In one further embodiment, a massage member drive assembly 130 is disposed in an operative engagement with a plurality of massage members 122, 124 wherein the operative engagement is at least partially defined by the massage member drive assembly 130 causing movement of each of the plurality of massage members 122, 124. In at least one further embodiment, the massage member drive assembly 130 causes a rotational movement of each of the plurality of massage members 122, 124, once again, such as is illustrated in FIG. 4 by way of rotational arrows 123, 125, respectively.

More in particular, a massage member drive assembly 130 includes at least one drive motor 134 having a drive member 136 interconnected thereto. In at least one embodiment, a drive shaft 135, which is interconnected to and rotated by the drive motor 134, is provided to interconnect a drive member 136 to a drive motor 134 in accordance with the present invention. In at least one further embodiment, a massage member drive assembly 130 includes a plurality of drive motors 134 each having a corresponding one of a plurality of drive members 136 interconnected thereto via a drive shaft 135, once again, wherein each drive shaft 135 is interconnected to and rotated by a corresponding one of the plurality of drive motors 134, and which interconnects a drive member 136 to a corresponding drive motor 134 in accordance with the present invention. A drive member 136 in accordance with at least one embodiment of the present invention comprises a cylindrical configuration, such as a tire or wheel.

A massage member drive assembly 130 further comprises a drive mount chamber 132 which is dimensioned and configured to receive at least a drive motor 134 and a drive member 136 interconnected thereto. With reference to the illustrative embodiment of FIG. 5, a massage member drive assembly 130 comprises a drive mount chamber 132 dimensioned and configured to receive a drive motor 134, a drive member 136, and a drive shaft 135 interconnected therebetween, wherein the drive mount chamber 132 is formed in a portion of a massage head 112. As further shown in FIG. 5, upon actuation of the drive motor 134, the drive shaft 135 rotates in the direction of arrow 135', thereby causing the drive member 136 to rotate in the direction of arrow 136'. With continued reference to FIG. 5, rotation of the drive member 136 in the direction of arrow 136' causes rotation of the corresponding massage member 122, disposed within massage member sockets 128, in an opposite direction, such as shown by directional arrow 123.

In at least one embodiment, a massage member drive assembly 130 is configured to impart a vibrational movement to one or more massage members 122, 124. In one further embodiment, a massage member drive assembly 130 is configured to impart a vibrational movement to one or more massage members 122, 124 wherein the amplitude and/or frequency of the vibrational movement of one or more massage members 122, 124 may be selectively adjusted by a user of the present device 100.

A massage member drive assembly 130 in accordance with at least one embodiment of the present invention further comprises at least one pressure regulating member 138. More in particular, a pressure regulating member 138 in accordance with the present invention is operable to selectively adjust an amount of pressure applied to at least one massage member 122 by a drive member 136. As will be appreciated, selectively adjusting an amount of pressure applied to at least one massage member 122 by a drive member 136 also adjusts an amount of pressure applied to at least a portion of the person's breast by the at least one massage member 122 when placed into contact therewith. FIG. 5 presents one illustrative embodiment of a pressure regulating member 138 in accordance with the present invention. More in particular, as may be seen in FIG. 5, the pressure regulating member 138 comprises a deformable configuration which may be expanded or contracted in the direction shown by arrow 139. As will be appreciated, when the pressure regulating member 138 is expanded it will apply a greater amount of pressure to the drive member 136, which in turn will apply a greater amount of pressure to the person's breast by the massage member 122. Conversely, when the pressure regulating member 138 is contracted it will apply a lesser amount of pressure to the drive member 136, which in turn will apply a lesser amount of pressure to the person's breast by the massage member 122. In at least one embodiment, a pressure regulating member 138 may comprise a deformable bladder to which amounts of a gas or a liquid may be added to cause expansion thereof, or from which amounts of a gas or liquid may be removed to cause contraction thereof.

Figure 9:
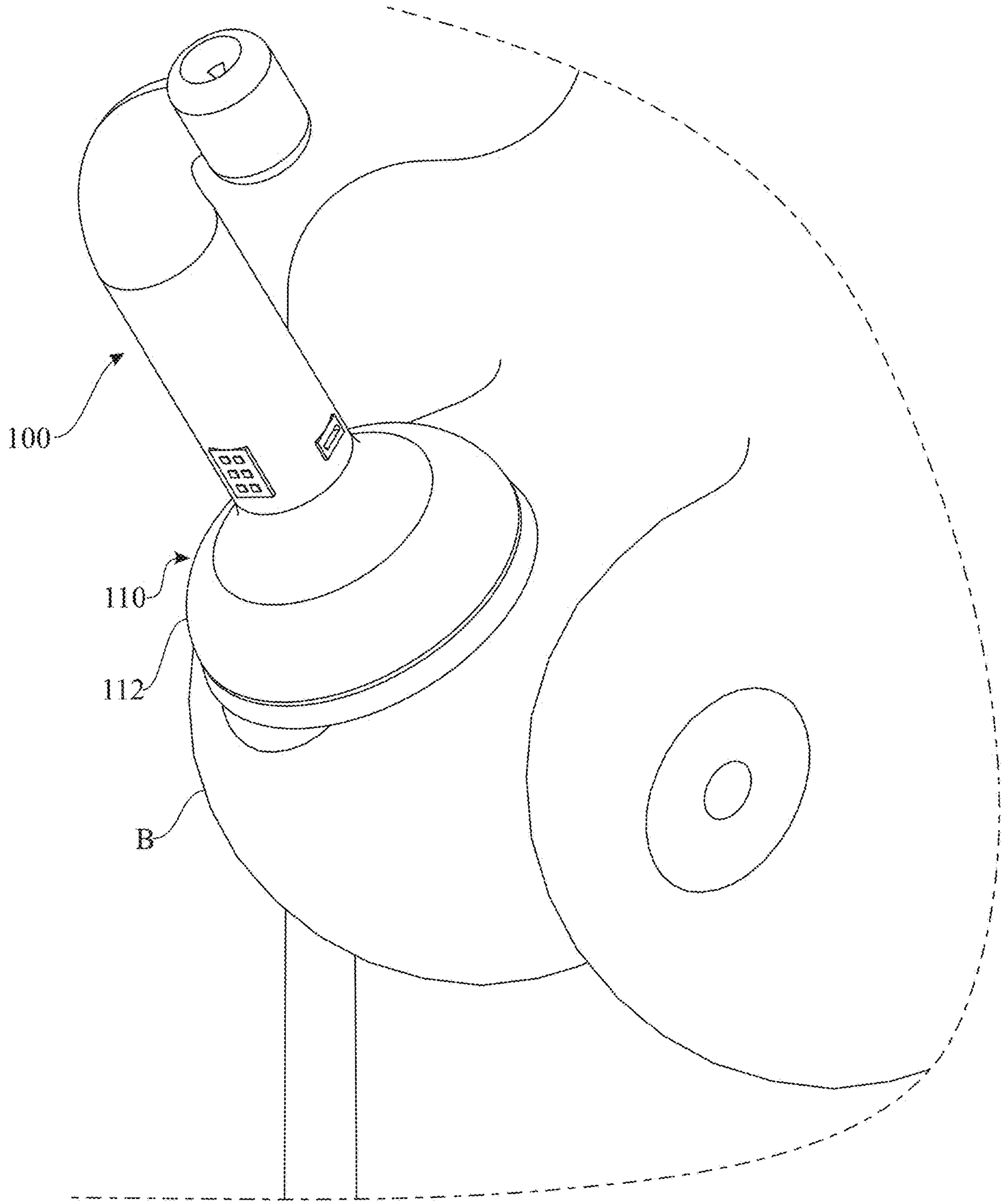
FIG. 9 presents a perspective view of one illustrative embodiment of a breast massage device disposed in a massaging orientation on a portion of a person's breast, in accordance with the present invention.

A breast massage device 100 in accordance with at least one embodiment of the present invention further comprises a suction assembly 140. A suction assembly 140 in at least one embodiment is dimensioned and configured to create a suction force proximate a massage head 112 of a massage head assembly 110 to facilitate maintaining the massage head 112 of the breast massage device 100 in an operative position on a portion of a person's breast (B), such as is shown by way of example in FIG. 9.

With reference once again to FIGS. 1 and 2, a breast massage device 100 includes a suction assembly 140 having an air intake 142, as shown in FIG. 2, in an air discharge 145, such as shown in FIG. 1. Looking next to FIG. 7, which presents a cross-sectional view of one illustrative embodiment of a breast massage device 100 in accordance with the present invention, a suction assembly 140 further comprises an intake channel 143 formed through a handle member 152 and disposed in fluid communication between air intake 142 and an intake channel discharge port 144. With continued reference to FIG. 7, the suction assembly 140 further comprises a discharge channel 146 formed through a handle member 152 and disposed in fluid communication between air discharge 145 and a discharge channel inlet port 147. As further shown in FIG. 2, the intake channel discharge port 144 and the discharge channel inlet port 147 are each disposed through a portion of the end cap 116 of the massage head assembly 110. In at least one embodiment, a suction assembly 140 further comprises a suction fan 148 operatively disposed in a suction unit 141 in fluid communication with discharge channel 146.

In operation, a suction fan 140, when actuated, is operative to draw an airflow into a discharge channel 146 through a discharge channel inlet port 147 and out through an air discharge 145. As will be appreciated, while a massage head 112 of the present breast massage device 100 is disposed in an operative position on a person's breast (B), once again, such as is shown by way of example in FIG. 9, the airflow drawn into and through the discharge channel 146 will necessarily cause an airflow into and through an air intake 142, into and though an air intake channel 143 and out through an intake channel discharge port 144, after which the airflow is drawn into the discharge channel inlet port 147 in the manner described hereinabove. As will be further appreciated, as the airflow exiting the intake channel discharge port 144 is drawn into the discharge channel inlet port 147, a suction force will be created in the end cap 116 of the massage head 112 of the massage head assembly 110, thereby facilitating maintenance of the massage head 112 in an operative position relative to a person's breast. In at least one embodiment, an end cap 116 comprises a concave configuration so as to further facilitate maintaining the massage head 112 in an operative massaging orientation relative to at least a portion of a person's breast.

A suction fan 148 in at least one embodiment of the present invention is adjustable to increase or decrease a suction force proximate a massage head 112 to facilitate maintaining the massage head in an operative massaging orientation on the person's breast. More in particular, a speed of a suction fan 148 may be increased or decreased so as to increase or decrease a suction force proximate a massage head 112, respectively. As will be appreciated, upon completion of a breast massage treatment, the suction fan 148 may be deactivated so as to eliminate the suction force proximate the massage head 112 of the present breast massage device 100 thereby allowing removal of the massage head 112 from the person's breast without causing discomfort.

A breast massage device 100 further comprises a handle assembly 150 having a handle member 152, as disclosed hereinabove. In at least one embodiment, a handle member 152 is dimensioned and configured for a user's hand to fit therearound to allow a user to place a massage head 112 of the breast massage device 100 proximate a portion of a person's breast to receive a breast massage treatment. As such, in at least one embodiment, a handle member 152 comprises an elongated configuration, such as is shown, by way of example, in FIGS. 1 and 2. As further shown in FIGS. 1 and 2, the handle member 152 of the handle assembly 150 serves to interconnect the suction assembly 140 with the massage head assembly 110. More in particular, and with reference to FIG. 3, in one embodiment, a handle assembly 150 includes a massage head assembly interface 154 which interconnects one end of the handle member 152 to the massage head assembly 110, and a suction assembly interface 156 which interconnects an oppositely disposed end of the handle member 152 to the suction assembly 140.

In at least one embodiment, a breast massage device 100 includes a control assembly 160. Looking again to FIG. 3, a control assembly 160 includes a control panel 162 having a plurality of control buttons 164 which are operable to permit selective operation of the present breast massage device 100. As one example, one or more of control buttons 164 may be programmed to allow a user to selectively activate and deactivate one or more of the plurality of drive motors 134 of a massage member drive assembly 130, as well as to selectively adjust the speed of the drive motors 134, thereby controlling the speed of rotation of the corresponding massage members 122, 124 operatively engaged therewith. As another example, one or more control buttons 164 of a control assembly 160 may be programmed to allow a user to selectively cause one or more pressure regulating member 138 to expand or contract, thereby allowing the user to selectively control the amount of pressure one or more of a plurality of massage members 122, 124 exert on the breast tissue of a person's breast which is subjected to a breast massage treatment with the present breast massage device 100.

A control assembly 160 in accordance with at least one further embodiment of the present invention may be programmed to control operation of a suction fan 148 of a suction assembly 140. As one example, at least one control button may be programmed to allow a user to selectively activate and deactivate a suction fan 148, thereby creating or eliminating a suction force proximate a massage head 112 of a massage head assembly 110. Additionally, in one further embodiment, one or more control buttons 168 of control assembly 160 may be programmed to allow a user to selectively increase or decrease a speed of rotation of a suction fan 148, thereby selectively increasing or decreasing, respectively, an amount of suction force exhibited proximate a massage heads 112 of a massage heads assembly 110, in accordance with the present invention. It is to be appreciated that a control assembly 160 in accordance with the present invention may include one or more audible and/or visual indicators, for example, one or more light-emitting diodes or LEDs, to allow a user to select desired operating parameters of the present breast massage device 100.

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A breast massage device for use on a person's breast comprising:

a massage head assembly comprising a massage head;

a massage member assembly including a plurality of massage members each disposed in a moveable engagement therewith, said massage member assembly interconnected to said massage head assembly;

a massage member drive assembly disposed in an operative engagement with at least one of said plurality of massage members to cause movement thereof, said massage member drive assembly comprising a motor interconnected to a drive member, said drive member operatively engaging said at least one of said plurality of massage members to cause movement thereof while said motor is actuated;

a pressure regulating member disposed in operative communication with said drive member, said pressure regulating member comprising an expandable and contractible deformable member configured to selectively adjust an amount of pressure applied to at least one of the plurality of massage members by the drive member, thereby adjusting an amount of pressure applied to at least a portion of the person's breast by the at least one of the plurality of massage members; and a suction assembly dimensioned and configured to create a suction force proximate said massage head to facilitate maintaining said massage head in an operative position on the person's breast.

2. The breast massage device of claim 1, wherein the massage head includes a cover and an end cap affixed thereto.

3. The breast massage device of claim 2, wherein the end cap includes a concave configuration to facilitate engagement of the massage head with the person's breast.

4. The breast massage device of claim 1, wherein the plurality of massage members are arranged in the massage member assembly in a massage member array.

5. The breast massage device of claim 1, wherein the massage member drive assembly is disposed in an operative engagement with each of the plurality of massage members to cause movement of each of the plurality of massage members.

6. The breast massage device of claim 1, wherein the massage member assembly includes at least one massage member socket dimensioned and configured to receive the at least one of the plurality of massage members therein, the at least one of the plurality of massage members moveably retained in the at least one massage member socket.

7. The breast massage device of claim 1, wherein the massage member assembly includes a plurality of massage member sockets each dimensioned and configured to receive a different one of the plurality of massage members therein, each of the plurality of massage members moveably retained in a corresponding one of the plurality of massage member sockets.

8. The breast massage device of claim 1, wherein the plurality of massage members includes at least one enlarged massage member having a volume which is greater than another of the plurality of massage members.

9. The breast massage device of claim 1, wherein the drive member is a wheel.

10. The breast massage device of claim 1, wherein the suction assembly includes an intake channel and a discharge channel disposed in fluid communication with the massage head.

11. The breast massage device of claim 10, wherein the suction assembly includes a suction fan disposed in fluid communication with the discharge channel and operative to cause an airflow into and through the intake channel and out through the discharge channel, the airflow creating the suction force proximate the massage head.

12. The breast massage device of claim 11, wherein a speed of the suction fan is adjustable to increase or decrease the suction force proximate the massage head to facilitate maintaining the massage head in an operative position on the person's breast.

13. A breast massage device for use on a person's breast comprising:

a massage head assembly comprising a massage head;

a massage member assembly including a plurality of massage members each disposed in a moveable engagement therewith, the massage member assembly interconnected to the massage head assembly;

a massage member drive assembly disposed in an operative engagement with each of the plurality of massage members to cause movement thereof;

the massage member drive assembly comprising a plurality of motors each interconnected to a corresponding one of a plurality of drive members, each of the plurality of drive members operatively engages a corresponding one of the plurality of massage members to cause movement thereof while a corresponding one of the plurality of motors is actuated;

a pressure regulating member disposed in operative communication with at least one of the plurality of drive members, the pressure regulating member comprising an expandable and contractible deformable member configured to selectively adjust an amount of pressure applied to at least one corresponding massage member of the plurality of massage members by the at least one of the plurality of drive members, thereby adjusting an amount of pressure applied to at least a portion of the person's breast by the at least one corresponding massage member; and a suction assembly dimensioned and configured to create a suction force proximate said massage head to facilitate maintaining said massage head in an operative position on the person's breast.

14. The breast massage device of claim 13, wherein the massage head includes a cover and an end cap affixed thereto, wherein the end cap comprises a concave configuration to facilitate engagement of the massage head with the person's breast.

15. The breast massage device of claim 13, wherein the massage member assembly further comprises a plurality of massage member sockets each dimensioned and configured to receive a different one of the plurality of massage members therein, each of the plurality of massage members moveably retained in a corresponding one of the plurality of massage member sockets.

16. The breast massage device of claim 13, wherein the suction assembly comprises a suction fan disposed in fluid communication with a discharge channel and operative to cause an airflow into and through an intake channel and out through the discharge channel, the airflow creating the suction force proximate the massage head, and wherein a speed of the suction fan is adjustable to increase or decrease the suction force proximate the massage head to facilitate maintaining the massage head in the operative position on the person's breast.

17. A breast massage device for use on a person's breast comprising:

a massage head assembly comprising a massage head;

the massage head having a cover and an end cap affixed thereto, wherein the end cap comprises a concave configuration to facilitate engagement of the massage head with the person's breast, a massage member assembly including a plurality of massage members each disposed in a moveable engagement therewith, the massage member assembly interconnected to the massage head assembly;

the massage member assembly further comprising a plurality of massage member sockets each dimensioned and configured to receive a different one of the plurality of massage members therein, each of the plurality of massage members moveably retained in a corresponding one of the plurality of massage member sockets;

a massage member drive assembly disposed in an operative engagement with each of the plurality of massage members, wherein the massage member drive assembly comprises a plurality of motors each interconnected to a corresponding one of a plurality of drive members, each of the plurality of drive members operatively engages a corresponding one of the plurality of massage members to cause movement thereof while a corresponding one of the plurality of motors is actuated;

a pressure regulating member disposed in operative communication with at least one of the plurality of drive members, the pressure regulating member comprising an expandable and contractible deformable member configured to selectively adjust an amount of pressure applied to at least one corresponding massage member of the plurality of massage members by the at least one of the plurality of drive members, thereby adjusting an amount of pressure applied to at least a portion of the person's breast by the at least one corresponding massage member;

a suction assembly dimensioned and configured to create a suction force proximate the massage head to facilitate maintaining the massage head in an operative position on the person's breast; and the suction assembly comprises a suction fan disposed in fluid communication with a discharge channel and operative to cause an airflow into and through an intake channel and out through the discharge channel, the airflow creating the suction force proximate the massage head, and wherein a speed of the suction fan is adjustable to increase or decrease the suction force proximate the massage head as needed to facilitate maintaining the massage head in an operative position on the person's breast.

* * * * *